(12) United States Patent
Hsu et al.

(10) Patent No.: US 9,363,844 B2
(45) Date of Patent: Jun. 7, 2016

(54) ENHANCE PERFORMANCE OF MAKING AN EMERGENCY CALL DURING RADIO LINK FAILURE OVER RADIO ACCESS TECHNOLOGY

(71) Applicant: QUALCOMM Incorporated, San Diego, CA (US)

(72) Inventors: Cherng-Shung Hsu, San Diego, CA (US); Zhong Ren, San Diego, CA (US); Shyamal Ramachandran, San Diego, CA (US); Anisha Elizabeth Jonas, San Diego, CA (US); Vitaly Drapkin, San Diego, CA (US); Kanuganti Rajeswar Reddy, San Diego, CA (US); Abhishek Bhatnagar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/466,496

(22) Filed: Aug. 22, 2014

(65) Prior Publication Data

US 2015/0065143 A1    Mar. 5, 2015

Related U.S. Application Data

(60) Provisional application No. 61/872,483, filed on Aug. 30, 2013.

(51) Int. Cl.
*H04W 76/02* (2009.01)
*H04W 36/00* (2009.01)
(Continued)

(52) U.S. Cl.
CPC ........ *H04W 76/027* (2013.01); *H04W 36/0061* (2013.01); *H04W 36/18* (2013.01); *H04W 48/16* (2013.01); *H04W 4/22* (2013.01); *H04W 76/028* (2013.01); *H04W 76/045* (2013.01); *H04W 88/06* (2013.01)

(58) Field of Classification Search
None
See application file for complete search history.

(56) References Cited

U.S. PATENT DOCUMENTS

| 2010/0087193 A1 | 4/2010 | Bishop et al. | |
|---|---|---|---|
| 2011/0105074 A1* | 5/2011 | Wu | H04W 76/028 455/404.1 |

(Continued)

FOREIGN PATENT DOCUMENTS

WO    WO-2012160246 A1    11/2012

OTHER PUBLICATIONS

3GPP ("3rd Generation Partnership Project; Technical Specification Group Radio Access Network; Evolved Universal Terrestrial Radio Access (E-UTRA); Radio Resource Control (RRC); Protocol Specification (Release 11)," 3GPP TS 36.331 v1 1.4.0 (Jun. 2013), Technical Specification, Jun. 2013, pp. 1-346, 3rd Generation Organizational Partners, Sophia Antip.*

(Continued)

*Primary Examiner* — Leon-Viet Nguyen
(74) *Attorney, Agent, or Firm* — Holland & Hart LLP

(57) ABSTRACT

Methods, systems, apparatuses and devices are described for managing a call during radio link failure. In one embodiment, radio link failure over a radio access technology may be detected during or after a call setup procedure. A public land mobile network and an equivalent public land mobile network may be selected. An initial search for cells of the radio access technology may be performed over the selected public land mobile network and the equivalent public land mobile network. The initial search may be performed once or twice based on a configurable parameter.

26 Claims, 10 Drawing Sheets

(51) Int. Cl.
*H04W 36/18* (2009.01)
*H04W 48/16* (2009.01)
*H04W 4/22* (2009.01)
*H04W 76/04* (2009.01)
*H04W 88/06* (2009.01)

(56) References Cited

U.S. PATENT DOCUMENTS

| | | | | |
|---|---|---|---|---|
| 2011/0117916 | A1* | 5/2011 | Dahlen | H04W 48/08 455/436 |
| 2013/0023265 | A1 | 1/2013 | Swaminathan et al. | |
| 2014/0023032 | A1* | 1/2014 | Kim | H04W 74/0833 370/329 |
| 2014/0078885 | A1* | 3/2014 | Koskinen | H04W 36/30 370/216 |

OTHER PUBLICATIONS

3GPP, "3rd Generation Partnership Project; Technical Specification Group Radio Access Network; Evolved Universal Terrestrial Radio Access (E-UTRA); User Equipment (UE) Procedures in Idle Mode (Release 11)," 3GPP TS 36.301 v11.4.0, Jun. 2013, pp. 1-34, 3rd Generation Organizational Partners, Sophia Antipolis, FR.
3GPP, "3rd Generation Partnership Project; Technical Specification Group Radio Access Network; Evolved Universal Terrestrial Radio Access (E-UTRA); Radio Resource Control (RRC); Protocol Specification (Release 11)," 3GPP TS 36.331 v11.4.0 (Jun. 2013), Technical Specification, Jun. 2013, pp. 1-346, 3rd Generation Organizational Partners, Sophia Antipolis, FR.
ISA/EPO, International Search Report and Written Opinion of the International Searching Authority, Int'l App. No. PCT/US2014/052475, Dec. 3, 2014, European Patent Office, Rijswijk, NL, 14 pgs.
IPEA/EPO, Second Written Opinion of the International Preliminary Examining Authority, Int'l. App. No. PCT/US2014/052475, Jul. 27, 2015, European Patent Office, Munich, DE, 9 pgs.
IPEA/EPO, Third Written Opinion of the International Preliminary Examining Authority, Int'l. App. No. PCT/US2014/052475, Nov. 30, 2015, European Patent Office, Munich, DE, 9 pgs.

* cited by examiner

ENHANCE PERFORMANCE OF MAKING AN EMERGENCY CALL DURING RADIO LINK FAILURE OVER RADIO ACCESS TECHNOLOGY

CROSS REFERENCES

The present Application for Patent claims priority to U.S. Provisional Patent Application No. 61/872,483 by Hsu et al., entitled "Enhance Performance Of Making An Emergency Call During Radio Link Failure Over Radio Access Technology," filed Aug. 30, 2013, assigned to the assignee hereof, and expressly incorporated by reference herein.

BACKGROUND

The following relates generally to management of calls (e.g., a voice call, an emergency voice call, etc.) during radio link failure. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of access points or base stations, each simultaneously supporting communication for multiple user equipments (UEs). Each access point or base station may have a respective coverage area. When an UE is within the coverage area of an access point or base station, a UE may communicate with the access point or base station on downstream and upstream links.

In some cases, a UE may place a call (e.g., a voice call, an emergency voice call, etc.) while on the edge of the coverage area of an access point or base station, or while in a hole in the coverage area of an access point or base station (e.g., inside an elevator). In such cases, the call may be dropped or the call setup procedure may be terminated due to radio link failure.

SUMMARY

The described features generally relate to one or more improved methods, systems, apparatuses, and/or devices for managing a call during radio link failure. When a call is dropped or a call setup procedure is terminated due to radio link failure, a UE may search for any suitable cell of any available radio access technology, over any public land mobile network (PLMN), in an attempt to re-establish a radio resource control (RRC) connection and either 1) maintain the call, or 2) continue the call setup procedure. However, such a broad all-encompassing search may be inefficient. In many cases, radio link failure may be the result of a temporary condition, and an initial search for cells of the radio access technology in use during the radio link failure, over the PLMN on which the radio link failure occurred, may provide an expedient avenue for successful RRC re-establishment.

A method for managing a call during radio link failure is described. In one configuration, radio link failure over a radio access technology may be detected during or after a call setup procedure. A public land mobile network and an equivalent public land mobile network may be selected. An initial search for cells of the radio access technology may be performed over the selected public land mobile network and the equivalent public land mobile network.

In one embodiment, the cell of the radio access technology may be identified based at least in part on the initial search. A radio resource control connection may be re-established on the identified cell. The call setup procedure may continue using the re-established radio resource control connection when the radio link failure is detected during the call setup procedure. In another example, an ongoing call may be maintained using the re-established radio resource control connection when the radio link failure is detected after the call setup procedure is completed.

In one configuration, the initial search for cells of the radio access technology over the selected public land mobile network and the equivalent public land mobile network may be performed once or twice based at least in part on a configurable parameter. In one embodiment, the selected public land mobile network may be the public land mobile network on which the radio link failure occurred.

In one example, a subsequent search for cells of another radio access technology over each available public land mobile network may be performed when a cell of the radio access technology has not been identified.

The radio access technology may be a Long Term Evolution (LTE) radio access technology and the other radio access technology is a non-LTE radio access technology. A radio resource control connection may be maintained with the radio access technology during the subsequent search for cells of the other radio access technology. A call setup procedure may be terminated over the radio access technology when a cell of the other radio access technology is identified. In one configuration, a notification may be generated that the call setup procedure has been terminated. In one example, an ongoing call over the radio access technology may be dropped when a cell of the other radio access technology is identified. A notification may be generated that the ongoing call has been dropped.

In one configuration, a subsequent search for cells of the radio access technology may be performed over each available public land mobile network when a cell of the other radio access technology has not been identified and a timer has not expired. A tracking area update procedure may be performed when a cell of radio access technology is identified over a non-selected public land mobile network or a non-selected equivalent public land mobile network.

In one example, a timer may be initiated when the radio link failure is detected. A transition may occur from a radio resource control connected (RRC_CONNECTED) state when the timer expires. A call setup procedure over the radio access technology may be terminated when the timer expires. A notification that the call setup procedure has been terminated may be generated. An ongoing call over the radio access technology may be dropped when the timer expires. A notification that the ongoing call has been dropped may be generated. The radio access technology may be a Long Term Evolution (LTE) radio access technology.

An apparatus for managing a call during radio link failure is also described. The apparatus includes means for detecting radio link failure over a radio access technology during or after a call setup procedure, means for selecting a public land mobile network and an equivalent public land mobile network, and means for performing an initial search for cells of the radio access technology over the selected public land mobile network and the equivalent public land mobile network.

An apparatus for managing a call during radio link failure is further described. The apparatus may include a processor and memory in electronic communication with the processor. Instructions may be stored in the memory. The instructions may be executable by the processor to detect radio link failure over a radio access technology during or after a call setup procedure, select a public land mobile network and an equivalent public land mobile network, and perform an initial search for cells of the radio access technology over the selected public land mobile network and the equivalent public land mobile network.

A computer program product for managing a call during radio link failure is also described. The computer program product may include a non-transitory computer-readable medium storing instructions executable by a processor to detect radio link failure over a radio access technology during or after a call setup procedure, select a public land mobile network and an equivalent public land mobile network, and perform an initial search for cells of the radio access technology over the selected public land mobile network and the equivalent public land mobile network.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
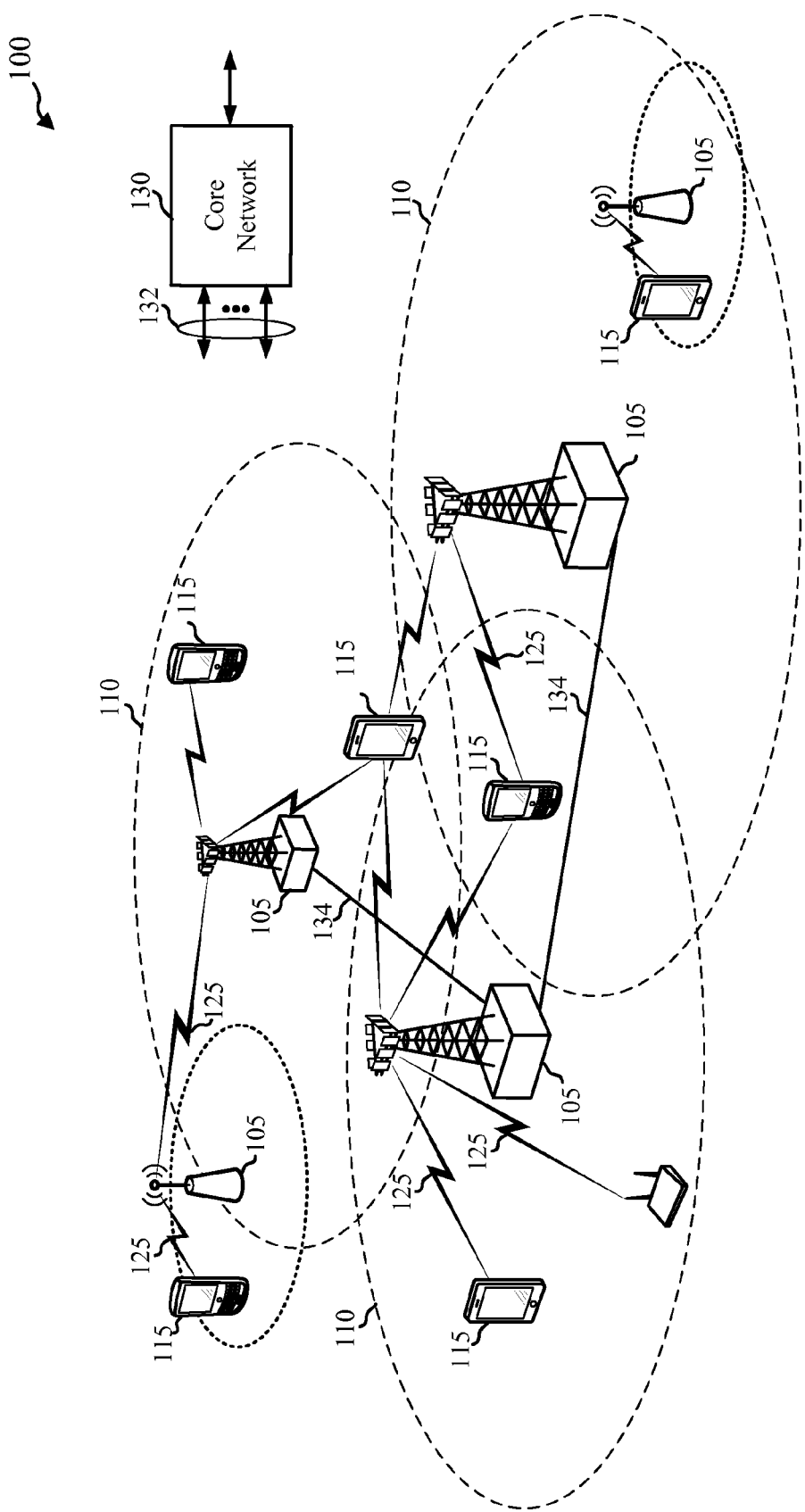
FIG. 1 is a diagram of an example of a wireless communications system.

The described features generally relate to one or more improved methods, systems, apparatuses, and/or devices for managing a call during radio link failure.

A UE may place a call, such as a voice call, while on the edge of the coverage area of an access point or base station, or while in a hole in the coverage area of an access point or base station (e.g., inside an elevator). In some cases, the call may be dropped or the call setup procedure may be terminated due to radio link failure. When a call is dropped or a call setup procedure is terminated due to radio link failure, a UE may search for any suitable cell of any available radio access technology, over any public land mobile network (PLMN), in an attempt to re-establish a radio resource control (RRC) connection and either 1) maintain the call, or 2) continue the call setup procedure. However, such a broad all-encompassing search may be inefficient.

In some cases, when a UE places an emergency call while on the edge of the coverage area of an access point or base station, or while in a hole in the coverage area of an access point or base station (e.g., inside an elevator), the emergency call may be dropped or the emergency call setup procedure may be terminated due to radio link failure. When an emergency call is dropped or an emergency call setup procedure is terminated due to radio link failure, a UE may search for any suitable cell of any available radio access technology, over any PLMN, in an attempt to re-establish a RRC connection and either 1) maintain the emergency call, or 2) continue the emergency call setup procedure. Once again, such a broad all-encompassing search may be inefficient.

In the context of a UE camped on a Long Term Evolution (LTE) base station, the following two successful IP Multimedia Subsystem (IMS) call scenarios, such as IMS emergency call scenarios, may be utilized. The first scenario may be for a normal attached UE (via LTE) and may include the following sequence of events:

1. UE performs normal attach procedure (attach phase);
2. User places an IMS call, such as an IMS emergency call (if selection decision is based on H.5 of standard TS23.167);
3. UE initiates UE-requested packet data network (PDN) connectivity to set up a PDN connection, such as an emergency PDN connection (PDN connection establishment phase, or emergency PDN connection establishment phase);
4. UE performs IMS registration procedure, such as IMS emergency registration procedure (IMS registration phase, or IMS emergency registration phase);
5. The IMS session, such as IMS emergency session, is set up (IMS call setup phase, or IMS emergency call setup phase); and
6. The call, or emergency call, is ongoing.

For purposes of this description, steps 1-5 may be referred to as a call setup procedure or, in certain examples, as an emergency call setup procedure.

The second successful IMS call scenario, or IMS emergency call scenario, may be for a Limited Service Mode (LSM) UE and may include the following sequence of events:

1. User places an IMS call, such as an IMS emergency call (if UE is camped on LTE);
2. UE performs attach procedure, such as an emergency attach procedure (including PDN connectivity setup, or emergency PDN connectivity setup) without IMS registration, such as IMS emergency registration (attach phase);
3. IMS session, such as IMS emergency session, is set up (IMS call setup phase, or IMS emergency call setup phase); and
4. The call, or emergency call, is ongoing.

For purposes of this description, steps 1-3 may be referred to as a call setup procedure, or, in certain examples, as an emergency call setup procedure.

The Radio Link Failure (RLF) may happen in any step after the RRC connection is set up in the above two scenarios. When a UE detects a radio link failure over LTE, the UE may start a timer to initiate an RRC connection re-establishment procedure. While the timer is running, the UE may search for suitable LTE cells or a cell of any non-LTE RAT to camp on. If the UE identifies a suitable cell over which the RRC connection can be re-established, the ongoing call can be maintained or the call setup procedure can be continued. However, if the UE identifies a non-LTE RAT to camp on, the call setup procedure may be terminated or the ongoing call may be dropped from the original LTE system. The UE or its user may then place another call.

The 3GPP standards, however, do not specify how or when to search for LTE cells or cells of non-LTE RATs, and thus, a UE may spend too much time (or all of the time until the timer expires) searching for suitable LTE cells, but find no suitable LTE cell over which to re-establish an RRC connection. Alternately, a UE may spend too much time (or all of the time until the timer expires) searching for cells of non-LTE RATs, but find no suitable cell and end up terminating the call setup procedure or dropping the ongoing call. These actions may result in inefficiencies that may in some cases be avoided by tailoring the manner in which a UE searches for available cells.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The system 100 includes base stations (or cells) 105, user equipments (UEs) 115, and a core network 130. The base stations 105 may communicate with the UEs 115 under the control of a base station controller, which may be part of the core network 130 or the base stations 105 in various embodiments. Base stations 105 may communicate control information and/or user data with the core network 130 through backhaul 132. In some embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters may transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base station 105 sites may provide communication coverage for a respective coverage area 110. In some embodiments, a base station 105 may be referred to as a base transceiver station, a radio base station, an access point, a radio transceiver, a basic service set (BSS), an extended service set (ESS), a NodeB, an evolved NodeB (eNodeB or eNB), a Home NodeB, a Home eNodeB, or some other suitable terminology. The coverage area 110 for a base station may be divided into sectors making up only a portion of the coverage area. The system 100 may include base stations 105 of different types (e.g., macro, micro, and/or pico base stations). There may be overlapping coverage areas for different technologies.

In some embodiments, the system 100 may be an LTE/LTE-A network. In LTE/LTE-A networks, the terms evolved Node B (eNB) may be generally used to describe the base stations 105. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul 132 (e.g., through core network 130). The wireless communications system 100 may support synchronous or asynchronous operation. For synchronous operation, the eNBs 105 may have similar frame timing, and transmissions from different eNBs may be approximately aligned in time. For asynchronous operation, the eNBs 105 may have different frame timing, and transmissions from different eNBs may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with macro eNBs, pico eNBs, femto eNBs, relays, and the like. In some cases, a UE 115 may have a multi-RAT modem and be capable of simultaneously communicating via more than one RAT.

The communication links 125 shown in system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions.

In some cases, a UE 115 may operate within the coverage areas 110 of more than one base station 105. In some cases, the base stations 105 may operate using different RATs (e.g., LTE/LTE-A or GSM). In these cases, UEs 115 having multi-RAT modems may simultaneously communicate with base stations 105 using different RATs.

Figure 2:
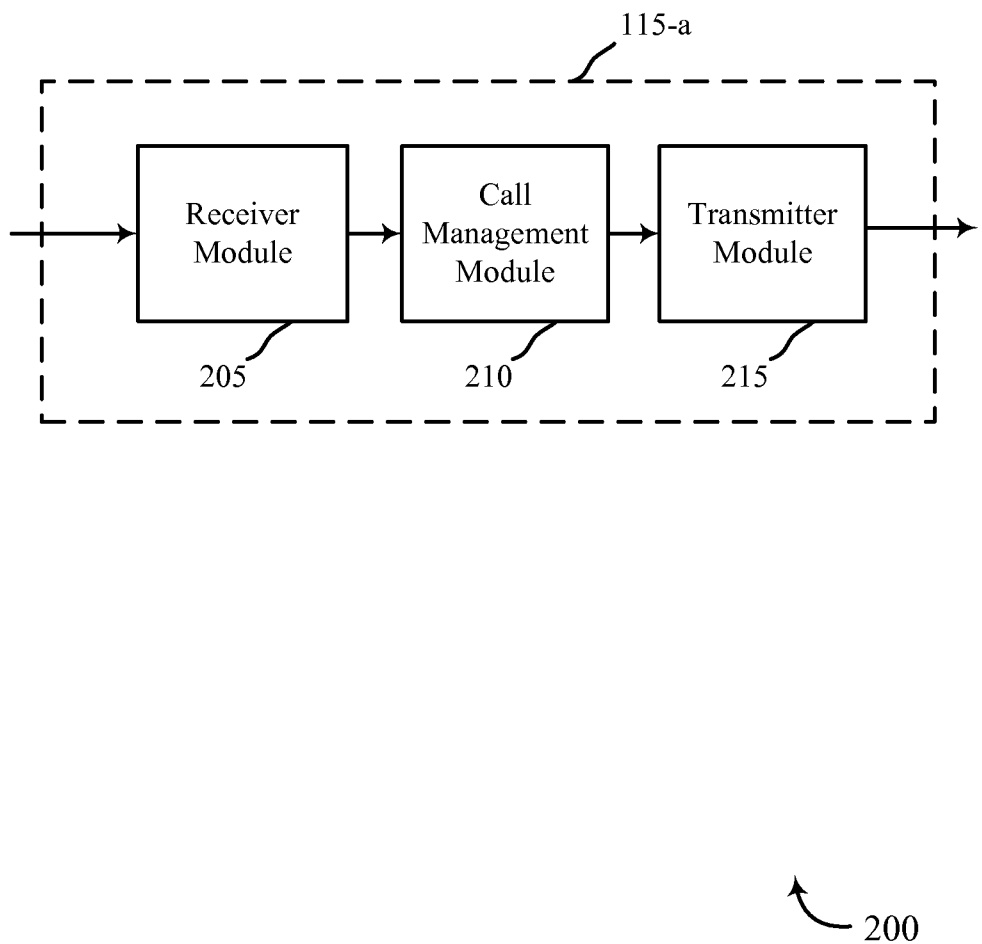
FIG. 2 is a block diagram of an example of a device (e.g., a UE) according to various embodiments.

Referring now to FIG. 2, a block diagram 200 illustrates a device 115-*a* for managing a call during radio link failure, in accordance with various embodiments. The device 115-*a* may be an example of one or more aspects of one of the UEs 115 described with reference to FIG. 1. The device 115-*a* may also be a processor. The device 115-*a* may include a receiver module 205, a call management module 210, and/or a transmitter module 215. Each of these components may be in communication with each other.

The components of the device 115-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 205 may include a number of cellular receivers, such as an LTE/LTE-A receiver, a Global System for Mobile communications (GSM) receiver, a Universal Mobile Telecommunication System (UMTS) receiver, and/or a single-carrier Radio Transmission Technology (1×RTT) receiver. The receiver module 205 may also include a non-cellular receiver (e.g., a WLAN receiver). The receiver module 205 may be used to receive various types of data and/or control signals, collectively referred to as information or transmissions, over one or more communication channels of a wireless communications system such as the wireless communications system 100 described with reference to FIG. 1. The data and/or control signals may in some cases be signals used to setup or maintain a call (e.g., a voice call, an emergency voice call, etc.).

The call management module 210 may perform various functions. In some embodiments, the call management module 210 may communicate with one or more base stations 105 or other access points to setup, maintain, and if necessary, re-establish, a call. Setting up the call may in some cases include establishing a radio resource control (RRC) connection with a cell (e.g., a base station).

In some cases, the call management module 210 may, in the event of a radio link failure, be capable of pausing a call setup procedure and/or maintaining an ongoing call. Upon detecting the radio link failure over a radio access technology (e.g., LTE) during or after a call setup procedure, the call management module 210 may perform a search for a cell of the same radio access technology or a different radio access technology, over a selected or non-selected public land mobile network (PLMN) or equivalent PLMN (EPLMN). When a suitable cell is located, the call management module 210 may in some cases be able to re-establish the RRC connection and continue the call setup procedure or maintain the call. By initially searching for cells of a selected PLMN or EPLMN, such as cells of the PLMN over which the call was being setup or maintained (or cells of an EPLMN with which the UE 115-*a* is already registered), the success rate and/or call setup time during a call setup procedure may be improved and/or the probability that an ongoing call can be maintained may be improved.

The transmitter module 215 may include a number of cellular transmitters, such as an LTE/LTE-A receiver, a GSM receiver, a UMTS receiver, and/or a 1 xRTT receiver. The transmitter module 215 may also include a non-cellular transmitter (e.g., a WLAN transmitter). The transmitter module 215 may be used to transmit various types of data and/or control signals, collectively referred to as information or transmissions, over one or more communication channels of a wireless communications system such as the wireless communications system 100 described with reference to FIG. 1. The data and/or control signals may in some cases be signals used to setup or maintain a call (e.g., a voice call, an emergency voice call, etc.).

Figure 3:
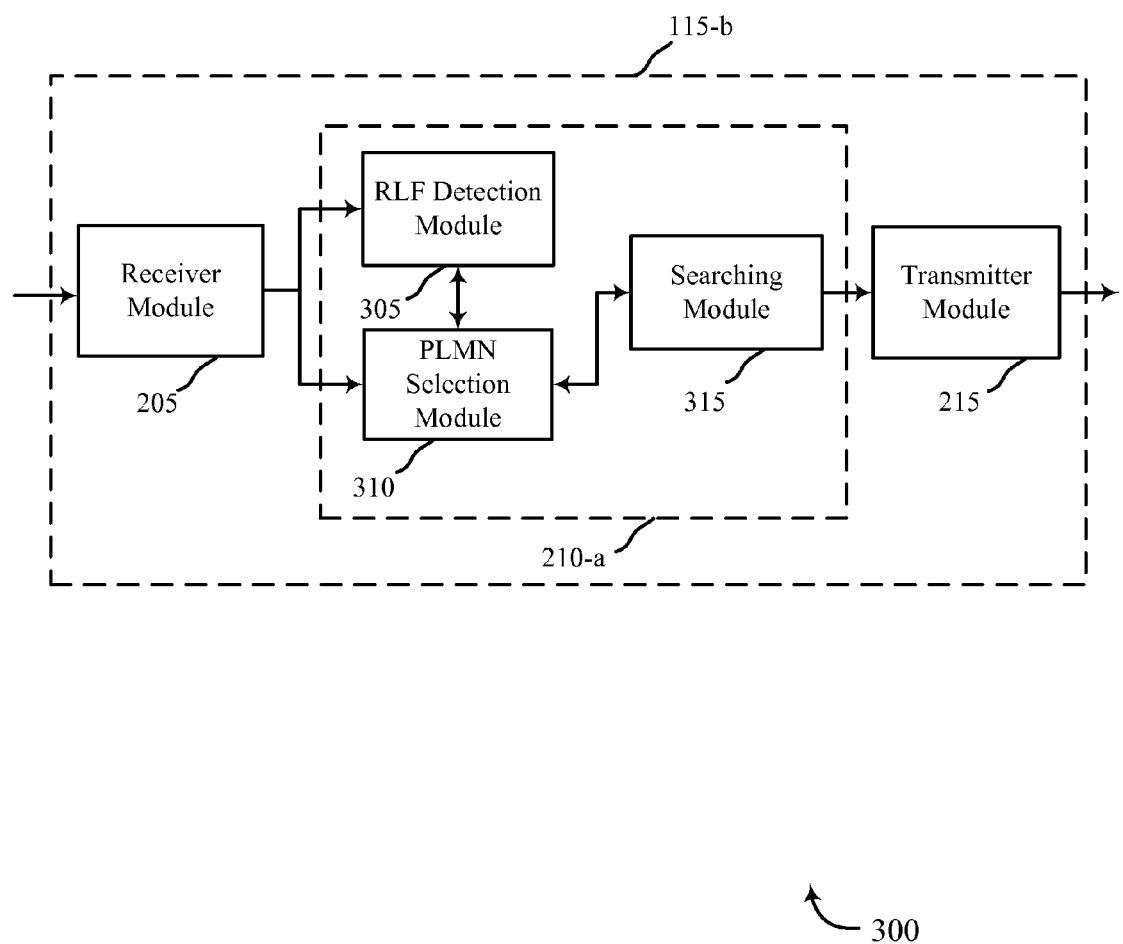
FIG. 3 is a block diagram of another example of a device (e.g., a UE) according to various embodiments.

Referring now to FIG. 3, a block diagram 300 illustrates another device 115-*b* for managing calls during radio link failure, in accordance with various embodiments. The device 115-*b* may be an example of one or more aspects of one of the UEs 115 described with reference to FIGS. 1 and/or 2. The device 115-*b* may also be a processor. The device 115-*b* may include a receiver module 205, a call management module 210-*a*, and/or a transmitter module 215. Each of these components may be in communication with each other.

The components of the device 115-*b* may, individually or collectively, be implemented using one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The receiver module 205 and transmitter module 215 may be configured similarly to what is described with reference to FIG. 2. The call management module 210-*a* may be an example of one or more aspects of the call management module 210 described with reference to FIG. 2 and may include a radio link failure (RLF) detection module 305, a PLMN selection module 310, and/or a searching module 315.

In some embodiments, the RLF detection module 305 may be used by the UE 115-*b* to detect a radio link failure over a radio access technology. The RLF detection module 305 may detect the radio link failure during or after a call setup procedure. In the latter case, a call may have already been established at the time of the radio link failure. The radio access technology may in some cases be an LTE radio access technology.

In some embodiments, the PLMN selection module 310 may be used by the UE 115-*b* to select a PLMN and an EPLMN. In some cases, the PLMN and EPLMN may be selected automatically by the UE 115-*b*. In some cases, the selected PLMN may be the PLMN on which the radio link failure detected by the RLF detection module 305 occurred.

In some embodiments, the searching module 315 may be used to search for a cell over which the call setup procedure may be continued or the ongoing call maintained. In some cases, an RRC connection with a cell may be established prior to the radio link failure detected by the RLF detection module 305, and the search for the cell over which the call setup procedure may be continued or the ongoing call maintained may be conducted in a manner that may improve 1) the success rate and/or call setup time during the call setup procedure and/or 2) the probability that an ongoing call can be maintained. In particular, the search may include performing an initial search for cells of the radio access technology over the selected PLMN and the EPLMN.

Upon identifying a cell of the radio access technology based at least in part on the initial search, an attempt to re-establish an RRC connection on the identified cell may be made by the call management module 210-*a* and, if successful, either the call setup procedure in process at the time of the radio link failure may be continued using the re-established RRC connection, or a call that was ongoing at the time of the radio link failure may be maintained using the re-established RRC connection.

Figure 4:
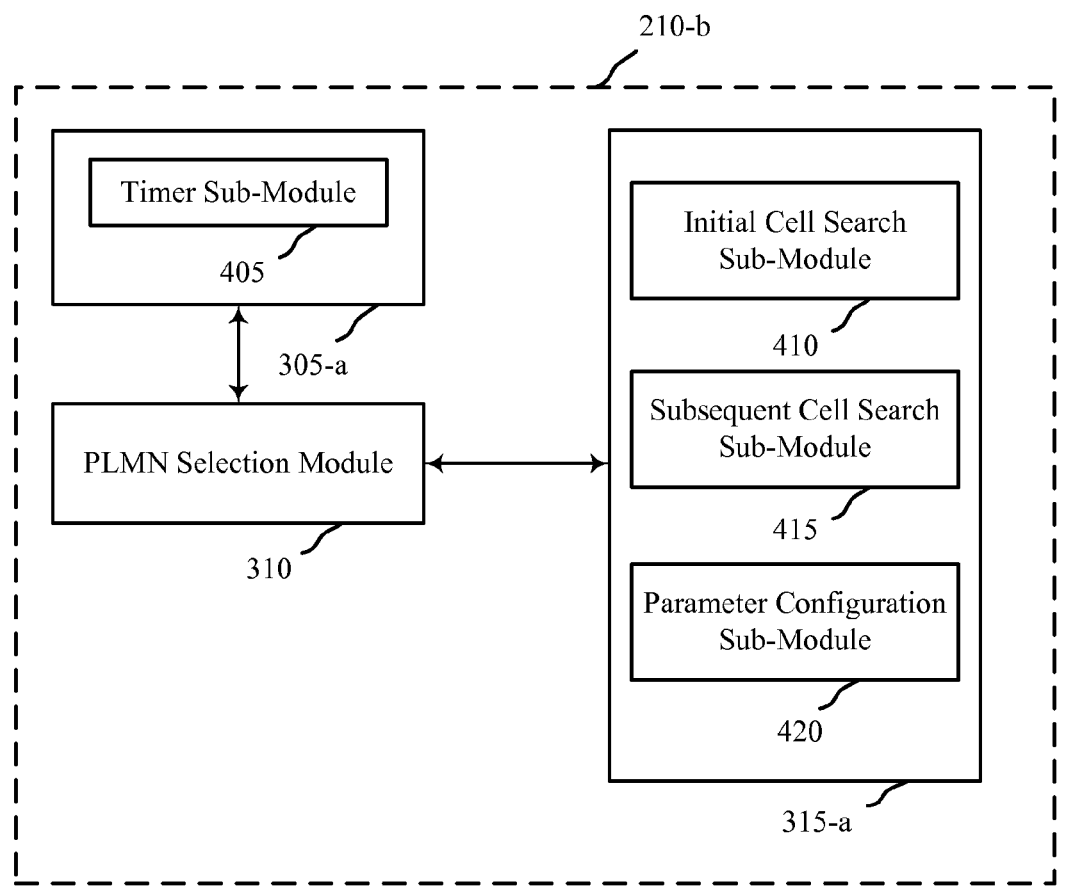
FIG. 4 is a block diagram of an example of a call management module according to various embodiments.

Referring now to FIG. 4, a block diagram 400 illustrates one embodiment of a call management module 210-*b* in accordance with various embodiments. The module 210-*b* may be an example of one or more aspects of the call management module 210 described with reference to FIGS. 2 and/or 3. The module 210-*b* may include an RLF detection module 305-*a*, a PLMN selection module 310, and/or a searching module 315-*a*, each of which may be an example of one or more aspects of the respective RLF detection module 305, PLMN selection module 310, and/or searching module 315 described with reference to FIG. 2.

The components of the call management module 210-*b* may, individually or collectively, be implemented using one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the RLF detection module 305-*a* may be used by a UE 115 to detect a radio link failure over a radio access technology. The RLF detection module 305-*a* may detect the radio link failure during or after a call setup procedure. In the latter case, a call may have already been established at the time of the radio link failure. The radio access technology may in some cases be an LTE radio access technology.

In some embodiments, the RLF detection module 305-*a* may include a timer sub-module 405. The timer sub-module 405 may be used to manage one or more timers. One of the timers may be initiated (e.g., started) upon detection of the radio link failure and may be used to limit the time a UE 115 maintains an RRC connection (e.g., remains in an RRC_CONNECTED state) while searching for a suitable cell to continue a call setup procedure or ongoing call.

In some embodiments, the PLMN selection module 310 may be used by a UE 115 to select a PLMN and an EPLMN. In some cases, the PLMN and EPLMN may be selected automatically by the UE 115. In some cases, the selected PLMN may be the PLMN on which the radio link failure detected by the RLF detection module 305-*a* occurred.

In some embodiments, the searching module 315-*a* may be used to search for a cell over which the call setup procedure may be continued or the ongoing call maintained. In some cases, an RRC connection with a cell may be established prior to the radio link failure detected by the RLF detection module 305-*a*, and the search for the cell over which the call setup procedure may be continued or the ongoing call maintained may be conducted in a manner that may improve 1) the success rate and/or call setup time during the call setup procedure and/or 2) the probability that an ongoing call can be maintained. In some embodiments, the searching module 315-*a* may include an initial cell search sub-module 410, a subsequent cell search sub-module 415, and/or a parameter configuration sub-module 420.

In some embodiments, the initial cell search sub-module 410 may be used to perform an initial search, for cells of the radio access technology for which the radio link failure was detected. The initial search may be performed for cells of the radio access technology over the selected PLMN and EPLMN. Upon identifying a cell of the radio access technology based at least in part on the initial search, an attempt to re-establish an RRC connection on the identified cell may be made by the call management module 210-*b* and, if successful, either the call setup procedure in process at the time of the radio link failure may be continued using the re-established RRC connection, or a call that was ongoing at the time of the radio link failure may be maintained using the re-established RRC connection.

In some cases, the attempt to re-establish an RRC connection may include transmitting an RRC connection re-establishment request to a base station 105; receiving an RRC connection re-establishment message from the base station 105; and then transmitting an RRC connection re-establishment complete message to the base station 105. In some cases, a timer may be used to limit the maximum amount of time spent on re-establishing an RRC connection. When the RRC connection cannot be re-established within the time period defined by the timer, the initial cell search sub-module 410 may be allowed to repeat the initial search. Alternately, control may be passed to the subsequent cell search sub-module 415.

In some embodiments, the initial cell search sub-module 410 may perform the initial search once or twice, based at least in part on a configurable parameter managed by the parameter configuration sub-module 420.

When a suitable cell is not identified by the initial cell search sub-module 410, and in some embodiments, the subsequent cell search sub-module 415 may perform a search for cells of another radio access technology over each available PLMN and EPLMN. In some cases, the search may include a search for cells of multiple other radio access technologies. The other radio access technology or technologies may include, for example, a non-LTE radio access technology (e.g., GSM, UMTS, 1×RTT, or WLAN). While performing the subsequent search, an RRC connection used for the call or call setup procedure taking place at the time of radio link failure may be maintained.

When the subsequent cell search sub-module 415 identifies a suitable cell during the search for cells of the other radio access technology or technologies, the call management module 210-*b* may either 1) drop an ongoing call (e.g., drop the call taking place at the time of radio link failure), or 2) terminate a call setup procedure over the radio access technology (e.g., terminate the call setup procedure taking place at the time of radio link failure). In some cases, the call may be dropped or the call setup procedure may be terminated in conjunction with terminating the maintained RRC connection (e.g., leaving an LTE RRC_CONNECTED state). The call management module 210-*b* may in some cases generate a notification that the ongoing call has been dropped or that the call setup procedure has been terminated.

Upon the call management module 210-*b* terminating the call setup procedure or dropping the call, and when a UE 115 incorporating the call management module 210-*b* has automatic redialing or a similar feature enabled, the call management module 210-*b* may automatically redial a number to attempt to establish or re-establish the call. In some cases, the attempt to establish or re-establish the call may be made using the identified cell of the other radio access technology. Alternately, a user receiving the notification generated by the call management module 210-*b* may place another call, which call may in some cases be routed over the identified cell of the other radio access technology.

In some cases, a timer may be used to limit the maximum amount of time the subsequent cell search sub-module 415 spends searching for cells of another radio technology. When a suitable cell cannot be identified within the time period defined by the timer, the subsequent cell search sub-module 415 may proceed to search for cells of the radio access technology in use during the radio link failure, but expand the search to include cells of the radio access technology over each available PLMN and EPLMN. If a suitable cell is identified during this search, it may be determined whether the identified cell is in the selected PLMN or EPLMN. When it is determined that the identified cell is within the selected PLMN or EPLMN, the call management module 210-*b* may attempt to re-establish an RRC connection on the identified cell. In some cases, re-establishment of the RRC connection may include transmitting an RRC connection re-establishment to a base station 105; receiving an RRC connection re-establishment message from the base station 105; and then transmitting an RRC connection re-establishment complete message to the base station 105. When the radio link failure detected by the RLF detection module 305-*a* is detected during a call setup procedure, the call setup procedure begun prior to the radio link failure may continue upon re-establishment of the RRC connection. Alternately, when the radio link failure detected by the RLF detection module 305-*a* is detected after a call setup procedure (e.g., during an ongoing call), an ongoing call begun prior to the radio link failure may be maintained upon re-establishment of the RRC connection.

When the subsequent cell search sub-module 415 determines that the identified cell is within a non-selected PLMN or non-selected EPLMN, and when the UE 115 incorporating the call management module 210-*b* is already registered with the PLMN or EPLMN of the identified cell, the call management module 210-*b* may perform a TAU procedure. When the PLMN or EPLMN of the identified cell accepts the TAU, the call management module 210-*b* may continue the call setup procedure begun prior to the radio link failure or maintain the call established prior to the radio link failure.

When the PLMN or EPLMN of the identified cell does not accept the TAU, the call management module 210-*b* may either 1) drop an ongoing call (e.g., drop the call taking place at the time of radio link failure), or 2) terminate a call setup procedure over the radio access technology (e.g., terminate the call setup procedure taking place at the time of radio link failure). In some cases, the call may be dropped or the call setup procedure may be terminated in conjunction with the call management module 210-*b* terminating the maintained RRC connection (e.g., leaving an LTE RRC_CONNECTED state). The call management module 210-*b* may in some cases generate a notification that the ongoing call has been dropped or that the call setup procedure has been terminated.

In some cases, a timer may be used to limit the maximum amount of time the subsequent cell search sub-module 415 spends searching for cells of the radio access technology in use during the radio link failure, re-establishing an RRC connection, and/or performing a TAU procedure. When a suitable cell cannot be identified and/or the RRC connection re-established within the time period defined by the timer, the subsequent cell search sub-module 415 may repeat any and all searches for a suitable cell.

When the call management module 210-*b* determines that the timer started by the timer sub-module 405 upon radio link failure has expired, the call management module 210-*b* may 1) drop an ongoing call or terminate a call setup procedure, and/or 2) another call may be automatically or manually placed.

The parameter configuration sub-module 420 may be used to automatically or manually configure parameters used by the call management module 210-*b*, such as the number of times the initial cell search sub-module 410 performs the initial search or the durations of the various timers.

Figure 5:
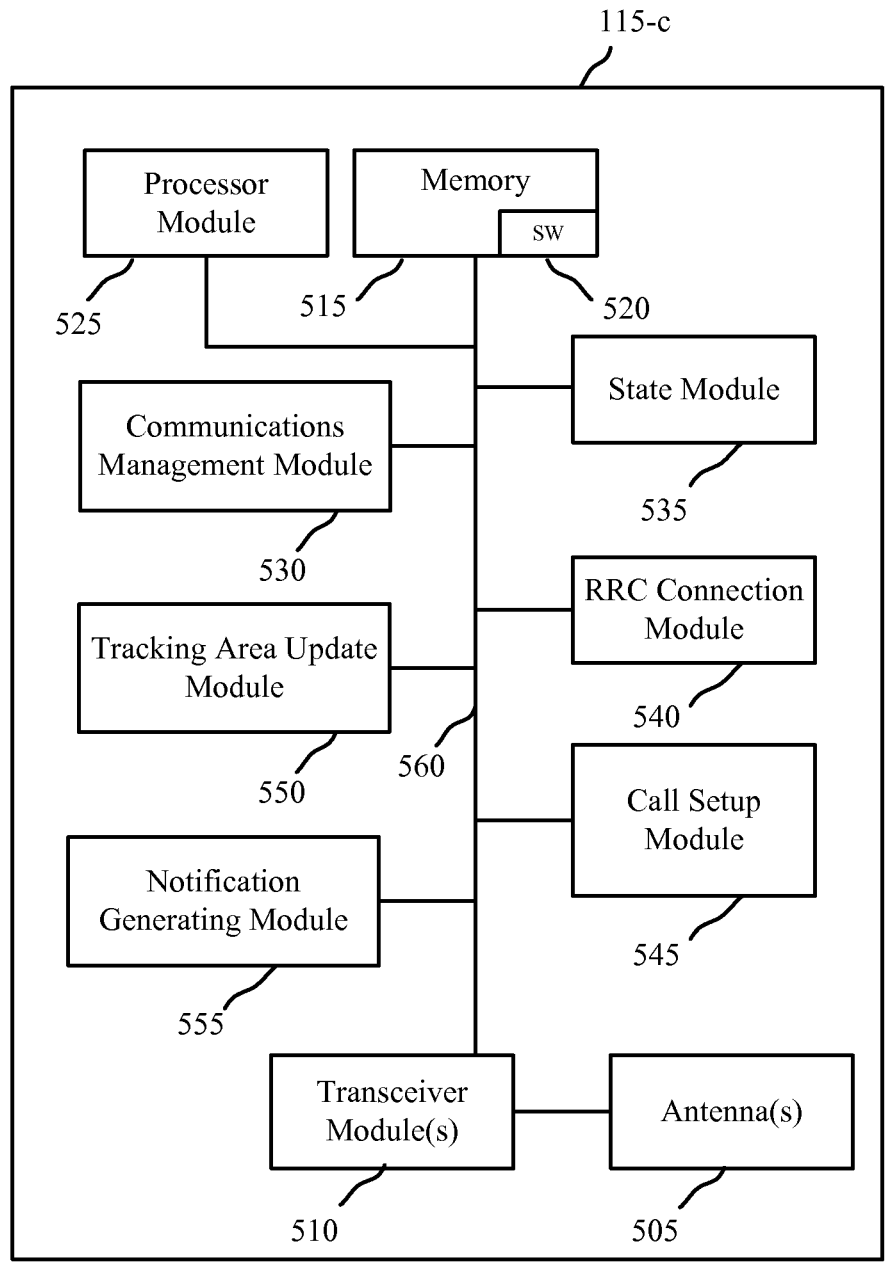
FIG. 5 is a block diagram of an example of a UE according to various embodiments.

FIG. 5 is an example of a block diagram 500 of a UE 115-*c*. The UE 115-*c* may be an example of one or more aspects of the UEs 115 described with reference to FIGS. 1, 2, 3, and/or 4. The UE 115-*c* may have any of various configurations and may be, or be included as part of, a personal computer (e.g., laptop computer, netbook computer, tablet computer, etc.), a cellular telephone, a PDA, a digital video recorders (DVR), an internet appliance, a gaming console, an e-reader, etc. The UE 115-*c* may have an internal power supply (not shown), such as a small battery, to facilitate mobile operation.

The UE 115-*c* may include a processor module 525, memory 515, transceiver module(s) 510, and/or antenna(s) 505. Each of these components may be in communication with each other, directly or indirectly, over one or more buses 560.

The memory 515 may include RAM and/or ROM. The memory 515 may store computer-readable, computer-executable software (SW) code 520 containing instructions configured to, when executed, cause the processor module 525 to perform various functions described herein for managing a call during radio link failure. Alternatively, the software code 520 may not be directly executable by the processor module 525, but be configured to cause the UE 115-*c* (e.g., when compiled and executed) to perform various of the functions described herein.

The processor module 525 may include an intelligent hardware device, e.g., a CPU, a microcontroller, an ASIC, etc. The processor module 525 may process information received via the antenna(s) 505 and the transceiver module(s) 510, and/or may send information to be transmitted via the transceiver module(s) 510 and the antenna(s) 505. The processor module 525 may handle, alone or in combination with other components or modules of the UE 115-*c* (e.g., the RRC connection module 540, the call setup module 545, the tracking area update module 550, and/or the notification generating module 555), various aspects of managing a call during radio link failure, as described herein. In some embodiments, the processor module 525 may implement one or more aspects of the call management module 210 described with reference to FIGS. 2, 3, and/or 4.

The transceiver module(s) 510 may be configured to communicate bi-directionally with base stations or other devices. The transceiver module(s) 510 may in some cases be implemented as one or more transmitter modules and one or more separate receiver modules. The transceiver module(s) 510 may be configured to modulate packets and provide modulated packets to the antenna(s) 505 for transmission, and to demodulate packets received from the antenna(s) 510. While the UE 115-*c* may have only a single antenna, the UE 115-*c* may also include multiple antennas 505.

According to the architecture of FIG. 5, the UE 115-*c* may further include a communications management module 530 and a state module 535. The communications management module 530 may establish and manage communications with base stations 105 and/or other UEs 115. By way of example, the communications management module 530 may be a component of the UE 115-*c* in communication with some or all of the other components of the UE 115-*c* via the one or more buses 560. Alternatively, functionality of the communications management module 530 may be implemented as a component of the transceiver module(s) 510, as a computer program product stored in memory 515, and/or as one or more controller elements of the processor module 525.

The state module 535 may reflect and control the current device state (e.g., context, authentication, base station association, and/or other connectivity issues).

Turning now to the modules 540, 545, 550, and 555, the RRC connection module 540 may be used to establish an RRC connection with a base station or other device. In some embodiments, an RRC connection may be established during a call. In some cases, the RRC connection module 540 may maintain an RRC connection obtained for a call, despite a radio link failure over a radio access technology during the call or during a call setup procedure for the call. The RRC connection may be maintained, for a period of time, while one or more searches for a suitable cell to re-establish the RRC connection are performed. In some cases, a timer may be used to limit the time the UE 115-*c* maintains an RRC connection following radio link failure.

In some embodiments, the call setup module 545 may be used to perform a call setup procedure upon an indication, from the UE 115-*c* or its user, that a call needs to be placed. In some cases, the call setup module 545 may be capable of pausing a call setup procedure in the event of a radio link failure, and continuing the call setup procedure upon the UE's re-establishment of an RRC connection for the call.

In some embodiments, the tracking area update module 550 may be used to perform a tracking area update (TAU) procedure. A TAU procedure may in some cases be used to maintain a call or continue a call setup procedure via a cell of a radio access technology over a PLMN with which the UE 115-*c* is registered.

In some embodiments, the notification generating module 555 may be used to notify a user of the UE 115-*c* when a call has been dropped or when a call setup procedure has been terminated. Upon receiving the notification, the user may, for example, place another call. The notification generating module 555 may also, for example, generate a notification indicating that a radio link failure has occurred and/or indicate that the UE 115-*c* is undertaking steps to establish, maintain, or re-establish a call.

By way of example, the RRC connection module 540, call setup module 545, tracking area update module 550, and/or notification generating module 555 may be components of the UE 115-*c* in communication with some or all of the other components of the UE 115-*c* via the one or more buses 560. Alternatively, functionality of the modules 540, 545, 550, and/or 555 may be implemented as a computer program product stored in memory 515, and/or as one or more controller elements of the processor module 525.

The components of the UE 115-*c* may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the UE 115-*c*.

Figure 6:
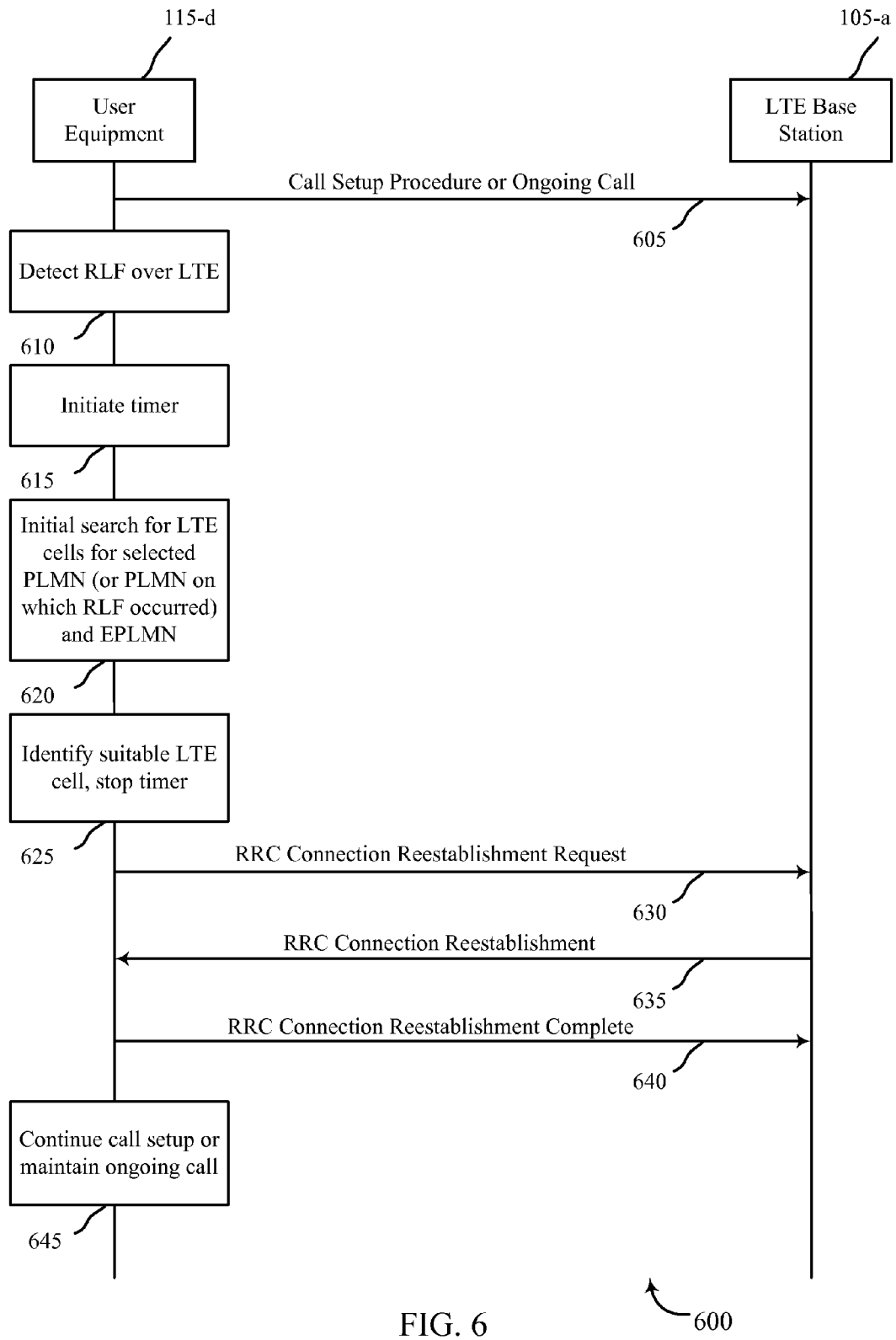
FIG. 6 is a message flow diagram illustrating one embodiment of communications between a UE and an LTE base station according to various embodiments.

FIG. 6 is a message flow diagram 600 illustrating one embodiment of communications between a UE 115-*d* and an LTE base station 105-*a* during the UE's management of a call, such as an emergency call, during radio link failure. The UE 115-*d* may be an example of one or more aspects of the UEs 115 described with reference to FIGS. 1, 2, 3, 4, and/or 5. The LTE base station 105-*a* may be an example of one or more aspects of the base stations 105 described with reference to FIG. 1.

The message flow may begin with the UE 115-*d* and LTE base station 105-*a* engaged in a call setup procedure such as an emergency call setup procedure, or ongoing call 605, which may be an emergency call. The call setup procedure or ongoing call 605 may be conducted over an LTE radio link.

At block 610, the UE 115-*d* may detect a radio link failure (i.e., a failure of the LTE radio link over which the call setup procedure or ongoing call 605 is being conducted). The operation(s) at block 610 may in some cases be performed using the call management module 210 described with reference to FIGS. 2, 3, and/or 4, the RLF detection module 305 described with reference to FIGS. 3 and/or 4, and/or the processor module 525 described with reference to FIG. 5.

At block 615, the UE 115-*d* may initiate a timer. The timer may be used to limit the time the UE 115-*d* may maintain an RRC connection (e.g., remain in an RRC_CONNECTED state) while searching for a suitable cell to continue the call setup procedure or ongoing call 605. Also at block 615, a PLMN and an EPLMN may be selected. The selected PLMN may in some cases be the PLMN on which the radio link failure occurred. It should be noted that in some cases, selecting the PLMN and/or EPLMN may occur before the call and/or the radio link failure detection. The operation(s) at block 615 may in some cases be performed using the call management module 210 described with reference to FIGS. 2, 3, and/or 4, the RLF detection module 305 and/or PLMN selection module 310 described with reference to FIGS. 3 and/or 4, and/or the processor module 525 described with reference to FIG. 5. The timer may be initiated and/or maintained using the timer sub-module 405 described with reference to FIG. 4.

At block 620, the UE 115-*d* may initiate a search for cells of the LTE radio access technology over the selected PLMN and EPLMN. The selected PLMN may be the PLMN on which the RLF occurred. The operation(s) at block 815 may in some cases be performed using the call management module 210 described with reference to FIGS. 2, 3, and/or 4, the searching module 315 described with reference to FIGS. 3 and/or 4, and/or the processor module 525 described with reference to FIG. 5.

Upon identifying a cell including the LTE base station 105-*a*, the UE 115-*d* may attempt to re-establish an RRC connection on the identified cell. In some cases, re-establishment of the RRC connection may include transmitting an RRC connection re-establishment request 630 to the LTE base station 105-*a*; receiving an RRC connection re-establishment message 635 from the LTE base station 105-*a*; and then transmitting an RRC connection re-establishment complete message 640 to the base station 105-*a*. The call setup procedure or ongoing call 605 may then be continued or maintained by the UE 115-*d* at block 645. The RRC connection establishment procedure defined at least in part by the exchange of messages 630, 635, and 640 may in some cases be performed using the call management module 210 described with reference to FIGS. 2, 3, and/or 4, and/or the processor module 525 described with reference to FIG. 5.

By initially searching for cells of the LTE radio access technology over the selected PLMN (or the PLMN on which RLF occurred) and the EPLMN, instead of randomly searching all cells of all radio access technologies over all available PLMNs, the success rate and/or call setup time during a call setup procedure may be improved and/or the probability that an ongoing call can be maintained may be improved.

Figure 7:
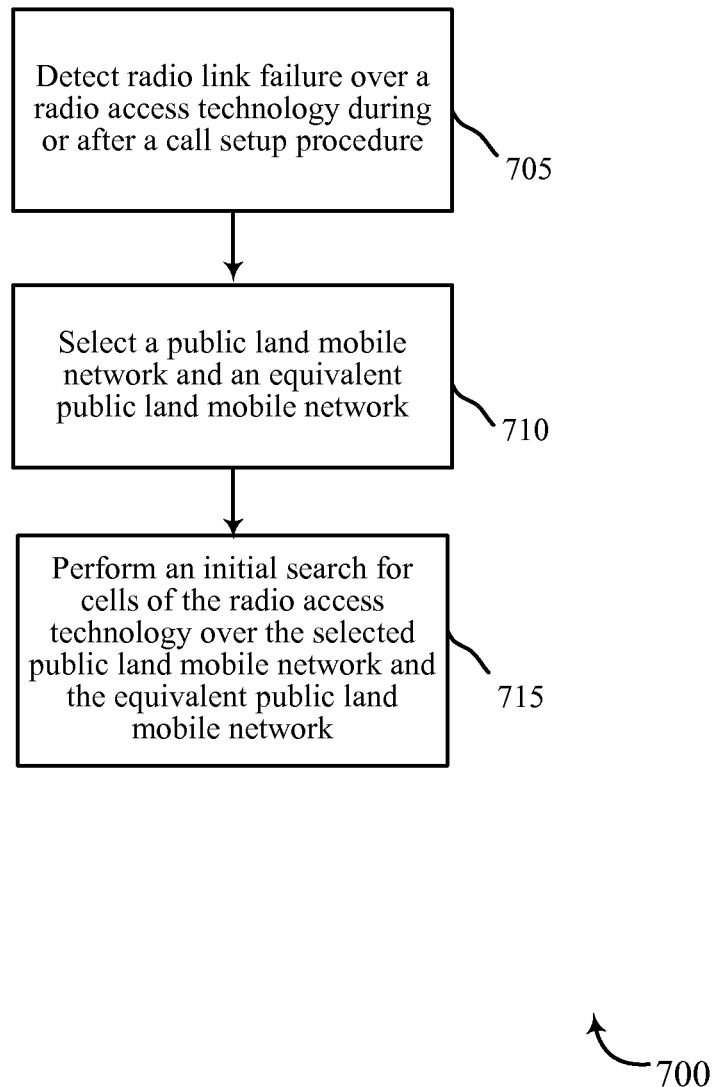
FIG. 7 is a flowchart of an example method for managing a call during radio link failure according to various embodiments.

FIG. 7 is a flow chart illustrating an example of a method 700 for managing a call during radio link failure. For clarity, the method 700 is described below with reference to one of the UEs 115 described with reference to FIGS. 1, 2, 3, 5, and/or 6, and/or the call management module 210 described with reference to FIGS. 2, 3, and/or 4. In one embodiment, a UE 115 may execute one or more sets of codes to control the functional elements of the UE 115 to perform the functions described below.

At block 705, radio link failure over a radio access technology may be detected. The radio link failure may be detected during or after a call setup procedure. In the latter case, a call may have already been established at the time of the radio link failure. The radio access technology may in some cases be an LTE radio access technology. The operation(s) at block 705 may in some cases be performed using the call management module 210 described with reference to FIGS. 2, 3, and/or 4, the RLF detection module 305 described with reference to FIGS. 3 and/or 4, and/or the processor module 525 described with reference to FIG. 5.

At block 710, a PLMN and an EPLMN may be selected. The selected PLMN may in some cases be the PLMN on which the radio link failure occurred. The operation(s) at block 710 may in some cases be performed using the call management module 210 described with reference to FIGS. 2, 3, and/or 4, the PLMN selection module 310 described with reference to FIGS. 3 and/or 4, and/or the processor module 525 described with reference to FIG. 5.

At block 715, an initial search for cells of the radio access technology may be performed over the selected PLMN and the EPLMN. The operation(s) at block 715 may in some cases be performed using the call management module 210 described with reference to FIGS. 2, 3, and/or 4, the searching module 315 described with reference to FIGS. 3 and/or 4, and/or the processor module 525 described with reference to FIG. 5.

By initially searching for cells of the radio access technology over the selected PLMN and the EPLMN, instead of randomly searching all cells of all radio access technologies over all available PLMNs, the success rate and/or call setup time during a call setup procedure may be improved and/or the probability that an ongoing call can be maintained may be improved.

Thus, the method 700 may provide for managing calls during radio link failure. It should be noted that the method 700 is just one implementation and that the operations of the method 700 may be rearranged or otherwise modified such that other implementations are possible.

Figure 8:
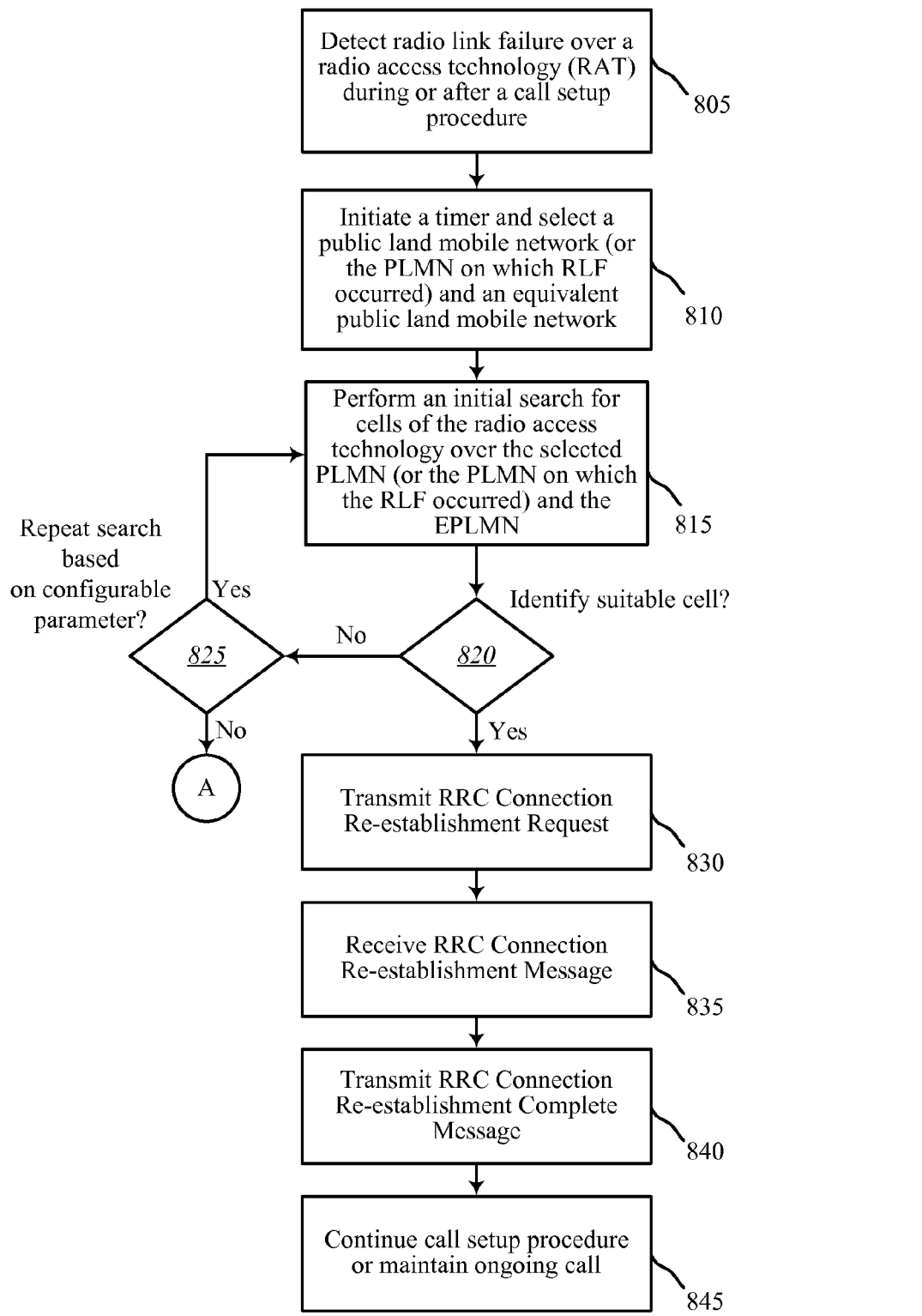
FIGS. 8-10 are flowcharts of another example method for managing a call during radio link failure according to various embodiments.
Figure 9:
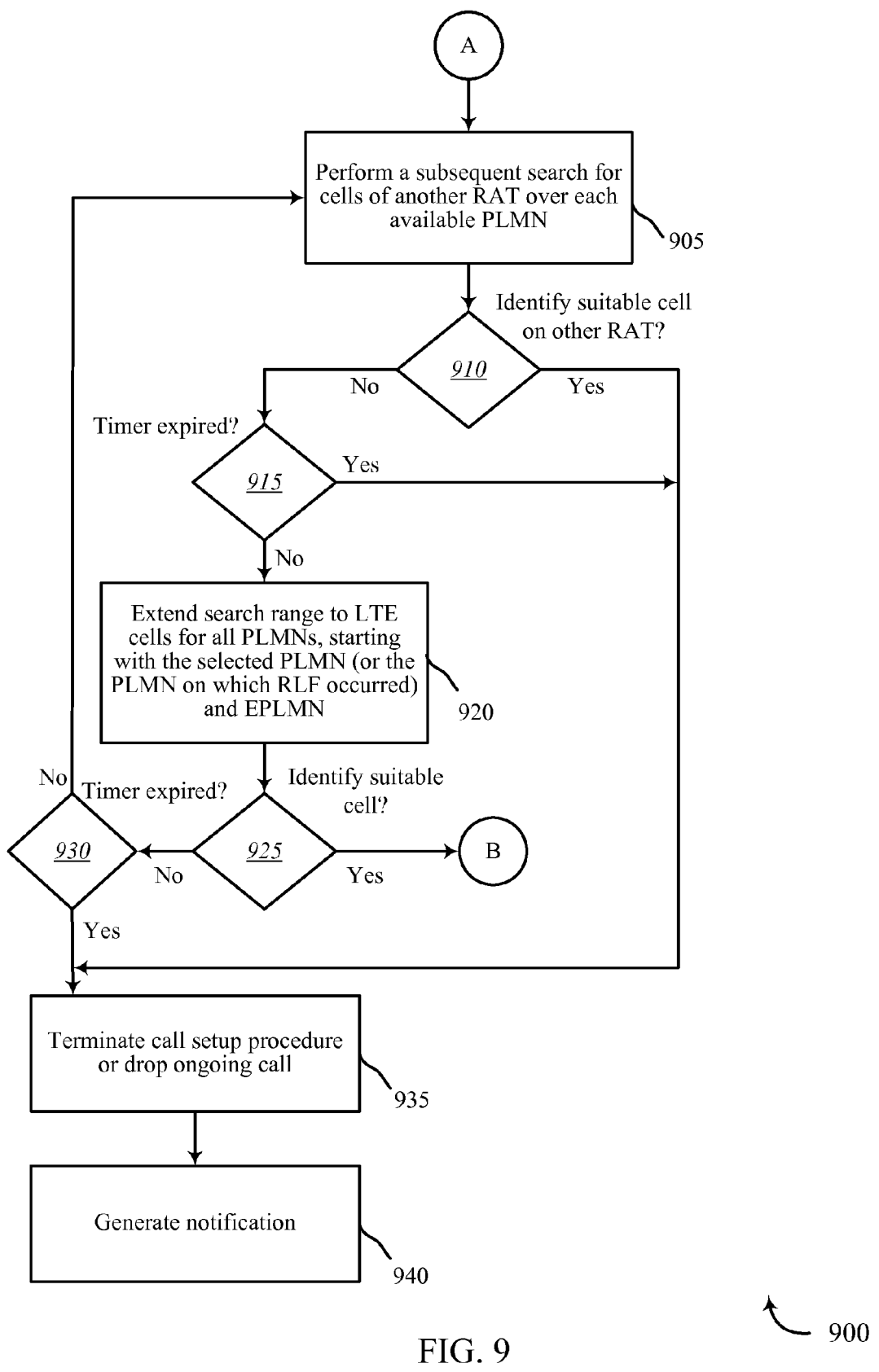
Figure 10:
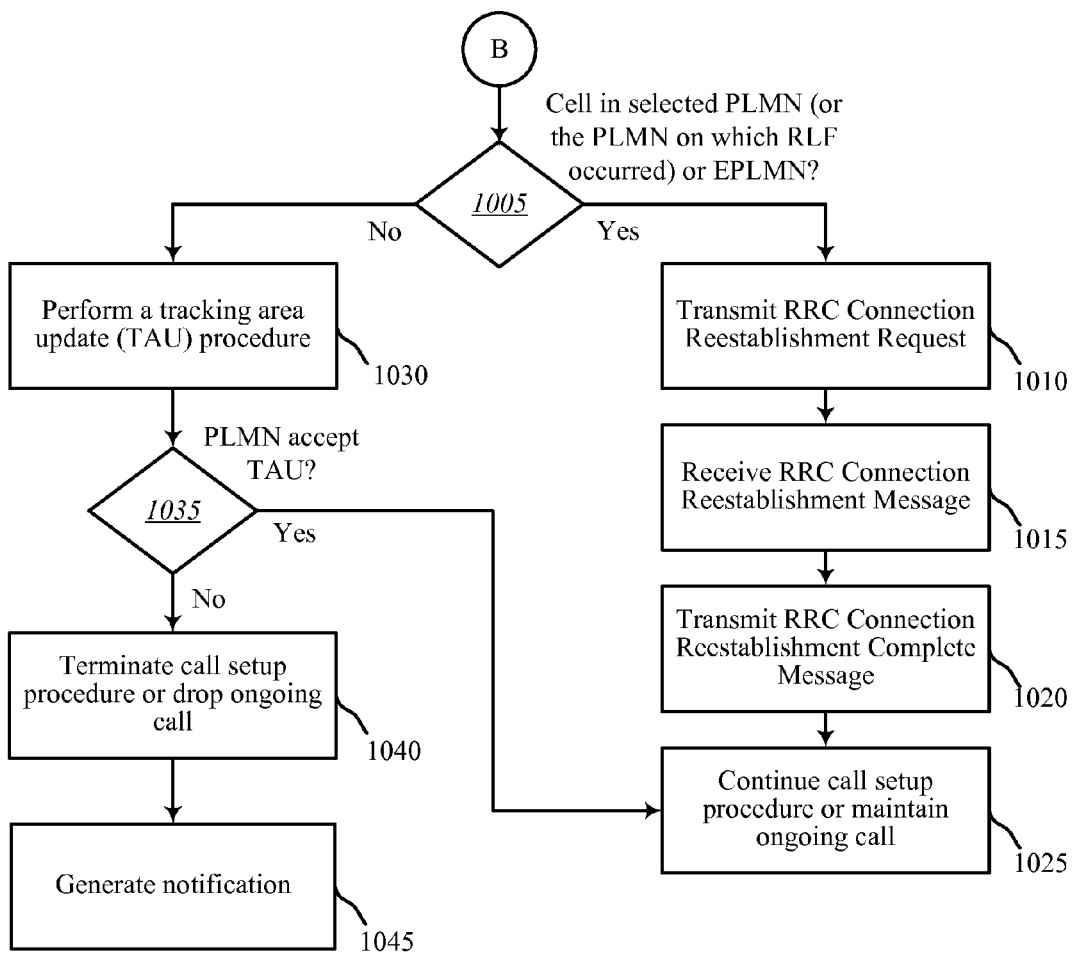

FIGS. 8-10 are flow charts illustrating an example of a method 800 for managing a call, such as an emergency call, during radio link failure. For clarity, the method 800 is described below with reference to one of the UEs 115 described with reference to FIGS. 1, 2, 3, 5, and/or 6, and/or the call management module 210 described with reference to FIGS. 2, 3, and/or 4. In one embodiment, a UE 115 may execute one or more sets of codes to control the functional elements of the UE 115 to perform the functions described below.

At block 805, radio link failure over a radio access technology may be detected. The radio link failure may be detected during or after a call setup procedure, such as an emergency call setup procedure. In the latter case, a call, which may be an emergency call, may have already been established at the time of the radio link failure. The radio access technology may in some cases be an LTE radio access technology. The operation(s) at block 805 may in some cases be performed using the call management module 210 described with reference to FIGS. 2, 3, and/or 4, the RLF detection module 305 described with reference to FIGS. 3 and/or 4, and/or the processor module 525 described with reference to FIG. 5.

When the radio link failure is detected, and at block 810, a timer may be initiated (e.g., started) and a PLMN and an EPLMN may be selected. The selected PLMN may be the PLMN on which the RLF occurred. The timer may be used to limit the time a UE 115 maintains an RRC connection (e.g., remains in an RRC_CONNECTED state) while searching for a suitable cell to continue a call setup procedure or ongoing call. The selected PLMN may in some cases be the PLMN on which the radio link failure occurred. The operation(s) at block 810 may in some cases be performed using the call management module 210 described with reference to FIGS. 2, 3, and/or 4, the RLF detection module 305 and/or PLMN selection module 310 described with reference to FIGS. 3 and/or 4, and/or the processor module 525 described with reference to FIG. 5. The timer may be initiated and/or maintained using the timer sub-module 405 described with reference to FIG. 4.

At block 815, an initial search for cells of the radio access technology may be performed over the selected PLMN (e.g., the PLMN on which the RLF occurred) and the EPLMN. The operation(s) at block 815 may in some cases be performed using the call management module 210 described with reference to FIGS. 2, 3, and/or 4, the searching module 315 described with reference to FIGS. 3 and/or 4, and/or the processor module 525 described with reference to FIG. 5.

When, at block 820, a suitable cell is identified during the initial search, the method 800 may attempt to re-establish an RRC connection on the identified cell at blocks 830, 835, 840, and 845. In some cases, re-establishment of the RRC connection may include transmitting an RRC connection re-establishment request at block 830 (e.g., transmitting the request to a base station 105); receiving an RRC connection re-establishment message at block 835 (e.g., receiving the message from the base station 105); and then transmitting an RRC connection re-establishment complete message at block 840 (e.g., transmitting the message to the base station 105). When the radio link failure detected at block 805 is detected during a call setup procedure, such as an emergency call setup procedure, the call setup procedure may continue, upon re-establishment of the RRC connection, at block 845. When the radio link failure detected at block 805 is detected after a call setup procedure (e.g., during an ongoing call, which may be an emergency call), an ongoing call may be maintained, upon re-establishment of the RRC connection, at block 845. In some cases, a timer may be used to limit the maximum amount of time spent on re-establishing an RRC connection at blocks 830, 835, and 840. When the RRC connection cannot be re-established within the time period defined by the timer, the method 800 may revert to, for example, the processing performed at block 825.

The operation(s) at block 830, 835, 840, and/or 845 may in some cases be performed using the call management module 210 described with reference to FIGS. 2, 3, and/or 4, and/or the processor module 525 and/or RRC connection module 540 described with reference to FIG. 5.

When, at block 820, a suitable cell is not identified during the initial search, the method 800 may proceed to block 825, where it may be determined whether to repeat the initial search for cells of the radio access technology over the selected PLMN and EPLMN (i.e., perform the initial search again). A determination to repeat the initial search, or not, may be based at least in part on a configurable parameter, such as an indication that the initial search is to be performed once or an indication that the initial search is to be performed twice. When a determination is made to repeat the initial search, processing may return to block 815. When a determination is made not to repeat the initial search, processing may proceed to block 905 of FIG. 9, as indicated by the connection bubbles labeled "A".

At block 905, a subsequent search, for cells of another radio access technology, may be performed over each available PLMN when a cell of the radio access technology is not identified after performing the initial search. In some cases, the search may include a search for cells of multiple other radio access technologies. The other radio access technology or technologies may include, for example, a non-LTE radio access technology (e.g., GSM, UMTS, 1×RTT, or WLAN). While performing the subsequent search, an RRC connection used for the call or call setup procedure taking place at the time of radio link failure may be maintained.

The operation(s) at block 905 may in some cases be performed using the call management module 210 described with reference to FIGS. 2, 3, and/or 4, the searching module 315 described with reference to FIGS. 3 and/or 4, and/or the processor module 525 described with reference to FIG. 5.

When, at block 910, a suitable cell is identified during the search for cells of the other radio access technology or technologies, the method 800 may proceed to block 935, where either 1) an ongoing call may be dropped (e.g., the call taking place at the time of radio link failure may be dropped), or 2) a call setup procedure over the radio access technology may be terminated (e.g., the call setup procedure taking place at the time of radio link failure may be terminated). In some cases, the call may be dropped or the call setup procedure may be terminated in conjunction with terminating the maintained RRC connection (e.g., leaving an LTE RRC_CONNECTED state). At block 940, a notification that the ongoing call has been dropped or that the call setup procedure has been terminated may be generated.

The operation(s) at block 935 and/or 940 may in some cases be performed using the call management module 210 described with reference to FIGS. 2, 3, and/or 4, and/or the processor module 525 and/or notification generating module 555 described with reference to FIG. 5.

Upon the call setup procedure being terminated or the call being dropped at block 935, and when a UE 115 has automatic redialing or a similar feature enabled, the UE 115 may automatically redial a number to attempt to establish or re-establish the call. In some cases, the attempt to establish or re-establish the call may be made using the identified cell of the other radio access technology. Alternately, a user receiving the notification generated at block 940 may place another call, which in some cases may be routed over the identified cell of the other radio access technology.

In some cases, a timer may be used to limit the maximum amount of time spent searching for cells of another radio technology at block 905. When a suitable cell cannot be identified within the time period defined by the timer, the method 800 may continue to, for example, the processing performed at block 915.

When, at block 910, a suitable cell (e.g., a cell of the other radio access technology or technologies) is not identified during the search for cells of the other radio access technology or technologies, the method 800 may proceed to block 915, where it may be determined whether the timer started at block 810 has expired. When it is determined that the timer has expired, the method may proceed to block 935, where an ongoing call may be dropped or a call setup procedure may be terminated as previously described. Another call may then be automatically or manually placed.

When it is determined at block 915 that the timer has not expired, a subsequent search for cells of the radio access technology may be performed at block 920. At block 920, however, the search may be performed over each available PLMN, and not just the PLMN selected at block 810. That is, the search for the radio access technology involved in the initial search at block 815 may be extended to LTE cells for all PLMNs. The search may begin with the selected PLMN (or the PLMN on which the RLF occurred) and EPLMN. The operation(s) at block 920 may in some cases be performed using the call management module 210 described with reference to FIGS. 2, 3, and/or 4, the searching module 315 described with reference to FIGS. 3 and/or 4, and/or the processor module 525 described with reference to FIG. 5.

When, at block 925, a suitable cell is not identified during the search for cells performed at block 920, the method 800 may proceed to block 930, where it may be determined whether the timer started at block 810 has expired. When it is determined that the timer has expired, the method 800 may proceed once again to block 935, where 1) an ongoing call may be dropped or a call setup procedure may be terminated, and/or 2) another call may be automatically or manually placed, as previously described. When it is determined that the timer has not expired, the method 800 may proceed to block 905, where the search for cells may continue.

When, at block 925, a suitable cell is identified during the search for cells performed at block 920, the method 800 may continue to block 1005 of FIG. 10, as indicated by the connection bubbles labeled "B".

At block 1005, it may be determined whether the cell identified at block 925 is in the selected PLMN (or PLMN on which the RLF occurred) or EPLMN. When it is determined that the identified cell is within the selected PLMN or EPLMN, the method 800 may attempt to re-establish an RRC connection on the identified cell at blocks 1010, 1015, 1020, and 1025. In some cases, re-establishment of the RRC connection may include transmitting an RRC connection re-establishment request at block 1010 (e.g., transmitting the request to a base station 105); receiving an RRC connection re-establishment message at block 1015 (e.g., receiving the message from the base station 105); and transmitting an RRC connection re-establishment complete message at block 1020 (e.g., transmitting the message to the base station 105). When the radio link failure detected at block 805 is detected during a call setup procedure, such as an emergency call setup procedure, the call setup procedure begun prior to the radio link failure may continue, upon re-establishment of the RRC connection, at block 1025. When the radio link failure detected at block 805 is detected after a call setup procedure (e.g., during an ongoing call, which may be an emergency call), an ongoing call begun prior to the radio link failure may be maintained, upon re-establishment of the RRC connection, at block 1025.

The operation(s) at block 1010, 1015, 1020, and/or 1025 may in some cases be performed using the call management module 210 described with reference to FIGS. 2, 3, and/or 4, and/or the processor module 525 and/or RRC connection module 540 described with reference to FIG. 5.

When it is determined at block 1005 that the identified cell is within a non-selected PLMN or non-selected EPLMN, and when the UE 115 performing the method 800 is already registered with the PLMN or EPLMN of the identified cell, the method 800 may continue with the performance of a TAU procedure at block 1030. When the PLMN of the identified cell accepts the TAU at block 1035, the call setup procedure or call begun prior to the radio link failure detected at block 805 may continue at block 1025.

When the PLMN of the identified cell does not accept the TAU at block 1035, the method 800 may proceed to block 1040, where either 1) an ongoing call may be dropped (e.g., the call taking place at the time of radio link failure may be dropped), or 2) a call setup procedure over the radio access technology may be terminated (e.g., the call setup procedure taking place at the time of radio link failure may be terminated). In some cases, the call may be dropped or the call setup procedure may be terminated in conjunction with terminating the maintained RRC connection (e.g., leaving an LTE RRC_CONNECTED state). At block 1045, a notification that the ongoing call has been dropped or that the call setup procedure has been terminated may be generated.

The operation(s) at block 1030 and/or 1035 may in some cases be performed using the call management module 210 described with reference to FIGS. 2, 3, and/or 4, and/or the processor module 525 and/or TAU module 550 described with reference to FIG. 5.

Upon the call setup procedure being terminated or the call being dropped at block 1040, and when a UE 115 has automatic redialing or a similar feature enabled, the UE 115 may automatically redial a number to attempt to establish or re-establish the call. In some cases, the attempt to establish or re-establish the call may be made using the identified cell of the other radio access technology. Alternately, a user receiving the notification generated at block 1045 may place another call, which in some cases may be routed over the identified cell of the other radio access technology.

In some cases, a timer may be used to limit the maximum amount of time spent searching for cells at block 920, re-establishing an RRC connection at blocks 1010, 1015, and 1020, and/or performing a TAU procedure at block 1030. When a suitable cell cannot be identified and/or the RRC connection re-established within the time period defined by the timer, the method 800 may continue to, for example, the processing performed at block 905 and/or 915.

By initially searching for cells of the radio access technology over the selected PLMN and the EPLMN, and then searching for cells of other radio access technologies and/or cells associated with a non-selected PLMN or non-selected EPLMN, the success rate and/or call setup time during a call setup procedure may be improved and/or the probability that an ongoing call can be maintained may be improved.

Thus, the method 800 may provide for managing calls during radio link failure. It should be noted that the method 800 is just one implementation and that the operations of the method 800 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS. LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. At the Physical layer, the transport channels may be mapped to Physical channels.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote light source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for managing a call during radio link failure, comprising:
   detecting radio link failure over an initial radio access technology during or after a call setup procedure;
   selecting a public land mobile network and an equivalent public land mobile network, wherein the selected public land mobile network is the public land mobile network on which the radio link failure occurred;
   performing an initial search for cells of the initial radio access technology over the selected public land mobile network and the equivalent public land mobile network;
   performing a first subsequent search for cells of another radio access technology over available public land mobile networks when a cell of the initial radio access technology has not been identified as a result of the initial search; and
   performing a second subsequent search for cells of the initial radio access technology over available public land mobile networks when a cell of the other radio access technology has not been identified as a result of the first subsequent search and a timer has not expired.

2. The method of claim 1, further comprising:
   identifying a cell of the initial radio access technology; and
   re-establishing a radio resource control connection on the identified cell.

3. The method of claim 2, further comprising:
   continuing the call setup procedure using the re-established radio resource control connection when the radio link failure is detected during the call setup procedure.

4. The method of claim 2, further comprising:
   maintaining an ongoing call using the re-established radio resource control connection when the radio link failure is detected after the call setup procedure is completed.

5. The method of claim 1, further comprising:
   performing the initial search for cells of the initial radio access technology over the selected public land mobile network and the equivalent public land mobile network a number of times based at least in part on a configurable parameter.

6. The method of claim 1, wherein the selected equivalent public land mobile network is an equivalent public land mobile network with which a device selecting the equivalent public land mobile network is registered.

7. The method of claim 1, wherein the initial radio access technology is a Long Term Evolution (LTE) radio access technology and the other radio access technology is a non-LTE radio access technology.

8. The method of claim 1, further comprising:
   maintaining a radio resource control connection with the initial radio access technology during the first subsequent search for cells of the other radio access technology.

9. The method of claim 1, further comprising:
   terminating a call setup procedure over the initial radio access technology when a cell of the other radio access technology is identified; and
   generating a notification that the call setup procedure has been terminated.

10. The method of claim 1, further comprising:
dropping an ongoing call over the initial radio access technology when a cell of the other radio access technology is identified; and
generating a notification that the ongoing call has been dropped.

11. The method of claim 1, further comprising:
performing a tracking area update procedure when a cell of the initial radio access technology is identified over a non-selected public land mobile network.

12. The method of claim 1, further comprising:
initiating the timer when the radio link failure is detected; and
transitioning from a radio resource control connected (RRC_CONNECTED) state when the timer expires.

13. The method of claim 12, further comprising:
terminating a call setup procedure over the initial radio access technology when the timer expires; and
generating a notification that the call setup procedure has been terminated.

14. The method of claim 12, further comprising:
dropping an ongoing call over the initial radio access technology when the timer expires; and
generating a notification that the ongoing call has been dropped.

15. The method of claim 1, wherein the initial radio access technology is a Long Term Evolution (LTE) radio access technology.

16. An apparatus for managing a call during radio link failure, comprising:
means for detecting radio link failure over an initial radio access technology during or after a call setup procedure;
means for selecting a public land mobile network and an equivalent public land mobile network, wherein the selected public land mobile network is the public land mobile network on which the radio link failure occurred;
means for performing an initial search for cells of the initial radio access technology over the selected public land mobile network and the equivalent public land mobile network;
means for performing a first subsequent search for cells of another radio access technology over available public land mobile networks when a cell of the initial radio access technology has not been identified as a result of the initial search; and
means for performing a second subsequent search for cells of the initial radio access technology over available public land mobile networks when a cell of the other radio access technology has not been identified as a result of the first subsequent search and a timer has not expired.

17. The apparatus of claim 16, further comprising:
means for identifying a cell of the initial radio access technology based at least in part on the initial search; and
means for re-establishing a radio resource control connection on the identified cell.

18. An apparatus for managing a call during radio link failure, comprising:
a processor;
memory in electronic communication with the processor; and
instructions stored in the memory, the instructions being executable by the processor to:
detect radio link failure over an initial radio access technology during or after a call setup procedure;
select a public land mobile network and an equivalent public land mobile network, wherein the selected public land mobile network is the public land mobile network on which the radio link failure occurred;
perform an initial search for cells of the initial radio access technology over the selected public land mobile network and the equivalent public land mobile network;
perform a first subsequent search for cells of another radio access technology over available public land mobile networks when a cell of the initial radio access technology has not been identified as a result of the initial search; and
perform a second subsequent search for cells of the initial radio access technology over available public land mobile networks when a cell of the other radio access technology has not been identified as a result of the first subsequent search and a timer has not expired.

19. The apparatus of claim 18, wherein the instructions are executable by the processor to:
identify a cell of the initial radio access technology based at least in part on the initial search; and
re-establish a radio resource control connection on the identified cell.

20. The apparatus of claim 19, wherein the instructions are executable by the processor to:
continue the call setup procedure using the re-established radio resource control connection when the radio link failure is detected during the call setup procedure.

21. The apparatus of claim 19, wherein the instructions are executable by the processor to:
maintain an ongoing call using the re-established radio resource control connection when the radio link failure is detected after the call setup procedure is completed.

22. The apparatus of claim 18, wherein the instructions are executable by the processor to:
perform the initial search for cells of the initial radio access technology over the selected public land mobile network and the equivalent public land mobile network a number of times based at least in part on a configurable parameter.

23. The apparatus of claim 18, wherein the selected equivalent public land mobile network is an equivalent public land mobile network with which a device selecting the equivalent public land mobile network is registered.

24. The apparatus of claim 18, wherein the instructions are executable by the processor to:
initiate the timer when the radio link failure is detected; and
transition from a radio resource control connected (RRC_CONNECTED) state when the timer expires.

25. The apparatus of claim 18, wherein the initial radio access technology is a Long Term Evolution (LTE) radio access technology.

26. A non-transitory computer-readable medium storing instructions executable by a processor to:
detect radio link failure over an initial radio access technology during or after a call setup procedure;
select a public land mobile network and an equivalent public land mobile network, wherein the selected public land mobile network is the public land mobile network on which the radio link failure occurred;
perform an initial search for cells of the initial radio access technology over the selected public land mobile network and the equivalent public land mobile network;
perform a first subsequent search for cells of another radio access technology over available public land mobile networks when a cell of the initial radio access technology has not been identified as a result of the initial search; and perform a second subsequent search for cells of the initial radio access technology over available public land mobile networks when a cell of the other radio access technology has not been identified as a result of the first subsequent search and a timer has not expired.

* * * * *